United States Patent [19]

Blahut

[11] 4,309,703

[45] Jan. 5, 1982

[54] SEGMENTED CHIRP WAVEFORM IMPLEMENTED RADAR SYSTEM

[75] Inventor: Richard E. Blahut, Owego Township, Broome County, N.Y.

[73] Assignee: International Business Machines Corporation, Armonk, N.Y.

[21] Appl. No.: 107,815

[22] Filed: Dec. 28, 1979

[51] Int. Cl.³ .............................................. G01S 7/28
[52] U.S. Cl. .............................. 343/17.2 PC; 375/23
[58] Field of Search ............... 343/17.2 R, 17.2 PC; 375/23

[56] References Cited

U.S. PATENT DOCUMENTS

| | | | |
|---|---|---|---|
| 3,299,427 | 1/1967 | Kondo | 343/17.1 |
| 3,344,426 | 9/1967 | Long | 343/17.2 PC |
| 3,487,406 | 12/1969 | Howard | 343/17.2 R |
| 3,898,660 | 8/1975 | Munster | 343/17.2 PC |
| 4,037,159 | 7/1977 | Martin | 343/17.2 PC |
| 4,101,891 | 7/1978 | Fletcher et al. | 343/17.2 PC |
| 4,123,719 | 10/1978 | Hopwood et al. | 343/17.2 PC |
| 4,142,189 | 2/1979 | Gleason | 343/9 |
| 4,161,732 | 7/1979 | Longuemare, Jr. | 343/17.2 PC |

*Primary Examiner*—S. C. Buczinski
*Attorney, Agent, or Firm*—Saul A. Seinberg

[57] ABSTRACT

In a radar system utilizing same, a segmented chirp waveform is built up by frequency hopping trains of simple chirp pulses. Each chirp pulse in a train is identical and is transmitted on one of a set of discrete carrier frequencies. The carrier frequencies are uniformly spaced in a predetermined bandwidth and are used in linear sequence. After transmitting on the last carrier frequency, the entire pattern is repeated, starting again at the first carrier frequency. The returns from the individual pulses are digitized and stored and the history thereof is then assembled by a digital signal processor into a high resolution image.

8 Claims, 8 Drawing Figures

SEGMENTED CHIRP WAVEFORM IMPLEMENTED RADAR SYSTEM

BACKGROUND OF THE INVENTION

1. Field of the Invention

This invention relates to the field of radar and, more particularly, to a radar system which employs a segmented chirp waveform implemented transmitter. Such a radar system is particularly suitable for use in conjunction with or as a digital image processor.

2. Description of the Prior Art

Imaging waveforms and, to a lesser extent, waveforms for moving target detection, require extremely high time-bandwidth products. Modern high resolution spotlight imaging radars use waveforms with time-bandwidth products as high as $5 \times 10^9$ (cycles). Classically, the use of a transmitted coherent train of precision wideband chirp pulses evolved as a type of waveform which is compatible with optical image processors. More recently, digital image processors have become popular and are often required to process radar returns originating from a train of wideband chirp pulses. This wide bandwidth imposes very high sampling rates on the collection of the digital data.

It is well known that the range resolution of a transmitting radar waveform is inversely proportional to the waveform bandwidth and that the doppler resolution is inversely proportional to the waveform duration. Hence, the need for a large time-bandwidth product for the total waveform is apparent. This need is not suitable for many applications that use digital processing because high sampling rates are not consistent with the analog-to-digital converters, data links and digital signal processors, especially in applications where such equipment is designed to be time shared with other functions.

Wideband chirp pulse transmitters have other shortcomings. Doppler shifts really depend not on carrier frequency, but on actual instantaneous frequency. For high resolution radars using very wide bandwidth waveforms, this can be a non-negligible effect and must be accounted for in the compensation processing. However, a single return has many reflected signals superimposed thereon and these cannot be separately compensated. Thus, one compensates only the carrier doppler and this limits resolution.

Wideband chirp-pulse-implemented radar systems also have accuracy problems. Extreme linearity is required and, in very high resolution systems, elaborate compensation is needed. Consequently, high resolution, bistatic synthetic aperture radar has not been feasible.

One attempt at improving radar system performance in a stacked beam configuration which utilizes a chirp generator is described in U.S. Pat. No. 3,344,426 issued to L. Long. In this arrangement, each chirp pulse is divided into a plurality of sub-pulses, each having a different frequency and width. The sub-pulses are then used to provide illumination energy at each elevation angle and thereby permit a large number of stacked beams to be illuminated by a single transmitted pulse.

U.S. Pat. No. 4,037,159 issued to A. Martin describes a communication system wherein a transmitter is adapted to forward successive chirp signals which start at different randomly determined initial frequencies. All of the chirp signals have the same frequency-time slope. Due to the action of a predetermined program known at a receiver station, only certain of the available chirp pulses are selected for transmission. There is no mention of chirp pulse bandwidth consideration, frequency spacing or suitability for use in radar systems.

In U.S. Pat. No. 3,898,660 issued to A. Munster, a pulsed sensor system is described wherein target response chirp pulses are first offset in frequency linearly with range, delayed as a function of frequency and then finally rechirped into narrow band chirp pulses suitable for processing. This action is taken to effect time-bandwidth interchange in order to allow the use of a low speed A/D converter.

It will be realized by those skilled in this art, that conventional chirp pulse generator implemented radar systems will not overcome the difficulties noted heretofore. The same can be said of a radar system incorporating a chirp generator which would operate as described in the foregoing prior art patents.

OBJECTS AND SUMMARY OF THE INVENTION

Accordingly, it is a principal object of the present invention to provide a radar system having a chirp generator which is adapted to solve the problems arising out of the use of a wide bandwidth transmission signal.

It is also a primary object of the present invention to provide a chirp pulse generator implemented transmitter which is suitable for efficient use in conjunction with digital processing of the return signals.

It is additionally an object of the present invention to provide a chirp pulse generator implemented radar system which is not resolution limited.

The foregoing and other objects of the present invention are accomplished through the provision of generator circuit means which yields a train of chirped pulses, each of said pulses being identical, and synthesizing circuit means for providing a discrete set of carrier frequencies uniformly spaced from each other within a predetermined bandwidth. Also provided are pulse mixing circuit means for combining one each of said chirped pulses and one of said carrier frequencies and timing circuit means for generating a series of timing pulses which operatively gate the chirp pulses and carrier frequency signals to said pulse mixing circuit means for combination therein. The cumulative effect of the operation of these elements is the generation of a series of narrowband pulses distributed uniformly within the predetermined wideband, a segmented chirp waveform.

The novel features which are considered characteristic of the present invention are set forth, in particular, in the appended claims. The invention itself, however, both as to its construction and its method of operation, together with additional objects, features and advantages thereof, will best be understood and are discernible from the following description when read in conjunction with the accompanying drawings.

DESCRIPTION OF THE PREFERRED EMBODIMENT

Figure 1:
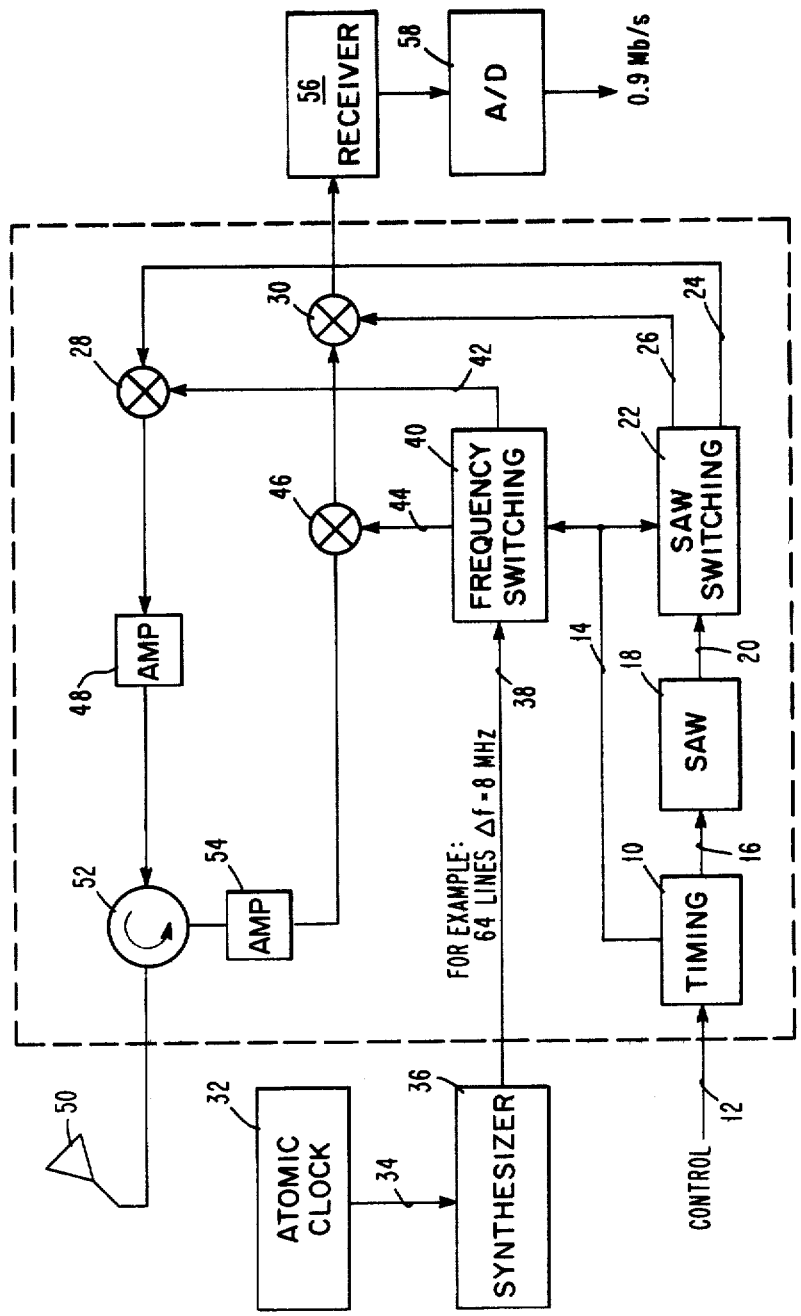
FIG. 1 schematically illustrates a block diagram of a simplified radar system which incorporates a segmented chirp waveform generator in accordance with the present invention.

Referring now to the drawings wherein like reference numerals have been used in the several views to identify like elements, FIG. 1 schematically illustrates a functional block diagram of a simplified radar system which includes a segmented chirp waveform generator in accordance with the present invention. It should be noted, prior to describing the present invention, that while it is set forth in the context of a pulsed radar system, other uses therefor, such as in sonar, seismic or optical sensor systems, are possible. Further, it should be apparent that while the present invention is described in conjunction with digital processing equipment and, in fact, was originally conceived in part as heretofore described to solve problems associated therewith, the present invention may also be employed with analog processing equipment.

In order to avoid undue burdening of this description with matter and specific details within the knowledge of those skilled in this art, a functional block diagram approach is employed herein. Where appropriate, a detailed functional description of each block or element is given together with specific identification of the device represented if necessary. Any individual is thus free to consult any of the presently available textbooks or treatises for a more specific detailed description of these well known blocks. The reader is referred, in particular, to "Introduction to Radar Systems" by Merrill I. Skolnik, published by McGraw-Hill Book Company in 1962; "Radar Design Principles" by Fred E. Nathanson, published by McGraw-Hill Book Company in 1969; and "Surface Wave Filters" by H. Matthews, published by John Wiley & Sons in 1977, which are incorporated herein by reference.

Figure 2A:
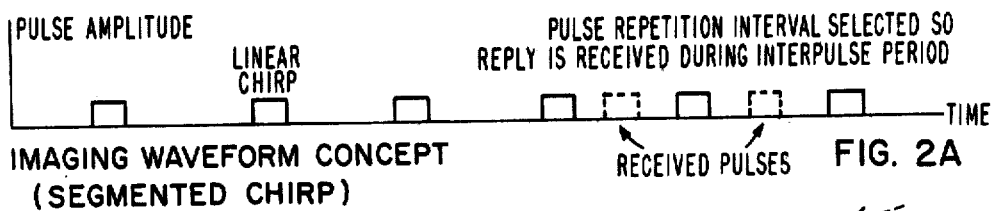
FIGS. 2A and 2B depict waveforms of the generated segmented chirp pulse train in accordance with the present invention on a time base vs. pulse frequency and amplitude respectively.
Figure 2B:
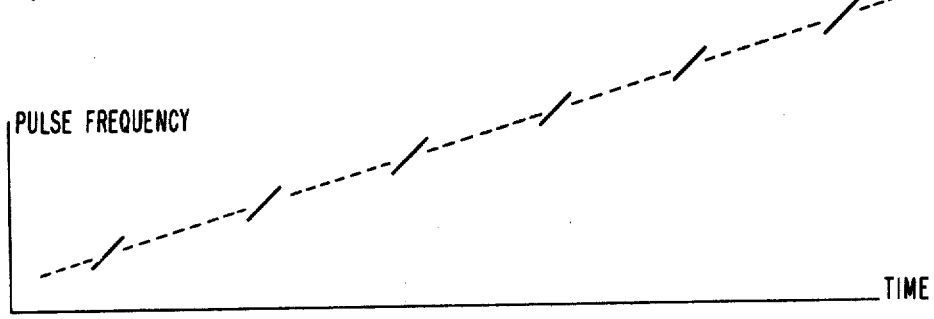

Turning now to FIG. 1, there is shown therein a timing circuit 10 which is actuated by an enabling pulse 12 from a control circuit (not shown). Timing circuit 10 develops a series of timing pulses on its output lines 14 and 16 for purposes to be described hereinafter. It should be noted that the frequency of the timing pulses is chosen so that their subsequent effect determines the repetition rate interval of the transmitted pulses and is therefore selected so that replies are received during interpulse periods, as is shown in FIG. 2B.

The SAW or surface acoustic wave generator 18 is a standard device which develops a series or train of interleaved chirp pulses. As used herein, a chirp pulse is a linear FM FM or frequency modulated pulse, whose instantaneous frequency varies linearly across the duration of the pulse and whose amplitude is approximately constant. The textbook by Matthews referred to previously contains an excellent description of SAW devices, particularly those applicable to radar and further details can be found therein. The chirp pulses developed in the SAW generator 18 are forwarded, via output line 20, to a SAW switching device 22 which also receives timing pulses via line 14 from the timing circuit 10.

The SAW switching device 22 separates the interleaved chirp pulse train received from the SAW generator 18, placing alternate ones respectively on its output lines 24 and 26, as enabled by the switching or gating action of the timing pulses. Output lines 24 and 26 are connected respectively to a mixer 28 and a demixer 30.

Also provided is an atomic clock 32 which serves as a very precise time and frequency standard. The clock output 34 is utilized to govern the operation of a synthesizer circuit 36 which generates a set of precisely selected carrier frequencies uniformly spaced from one another over a predetermined bandwidth. In the example used to describe the operation of the preferred embodiment, 64 frequencies or lines at a separation ($\Delta f$) of 8 MHz has been chosen as a typical output for the synthesizer circuit 36. It will be realized by those skilled in this art that various output combinations for the synthesizer circuit 36 are possible and that the example chosen above is by way of illustration and not limitation. The synthesizer output is forwarded via the output line 38 thereof to a frequency switching block 40. Upon receipt of one of the timing pulses, the carrier frequencies are made available serially by output lines 42 and 44 to mixer 28 and demixer 46. The synthesizer output, starting again at the initial selected carrier frequency is repeated as needed.

The mixer 28, as noted previously, receives a series of chirp pulses and a series of carrier frequencies, one each at intervals set by the gating action of the timing pulses at the SAW switching circuit 22 and the frequency switching circuit 40. The mixer 28 modulates a chirp pulse onto each carrier frequency, as shown in FIG. 2B, and forwards each such couple to a transmitting amplifier 48, where the segmented chirp waveform is amplified to an appropriate level prior to its transmission by the antenna 50. The segmented chirp waveform is passed to antenna 50 by the RF switch 52 which enables bidirectional use of the antenna 50. The RF switch 52 passes any signal received in the direction of the arrow shown to the next available port. Thus, the segmented chirp waveform is routed to the antenna 50 and the reply signals are switched in a similar manner to the amplifier 54.

Figure 3A:
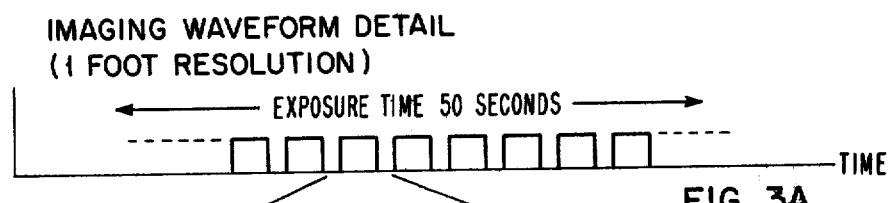
FIGS. 3A–3D show via waveform illustration, the use of a linear chirp pulse in accordance with the present invention as it is telescoped to an exposure time for illumination of a target area.
Figure 3B:
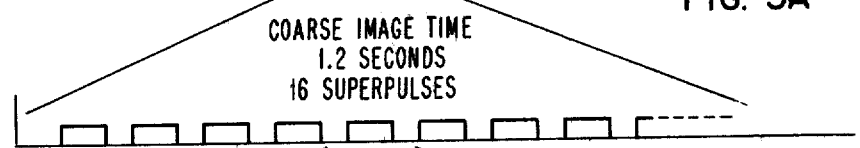
Figure 3C:
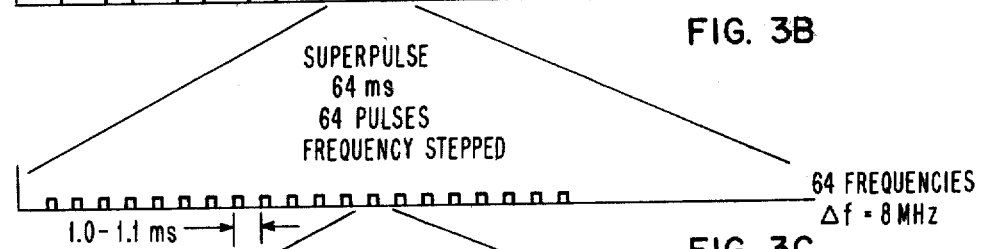
Figure 3D:
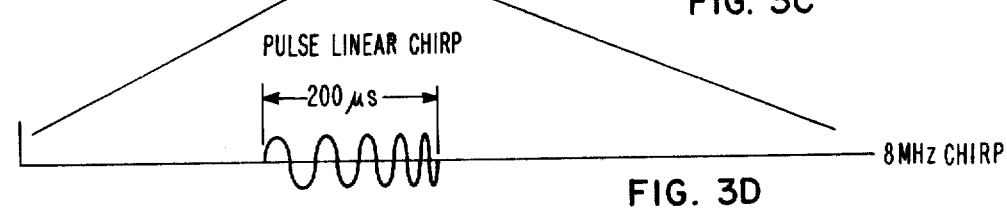
Figure 4:
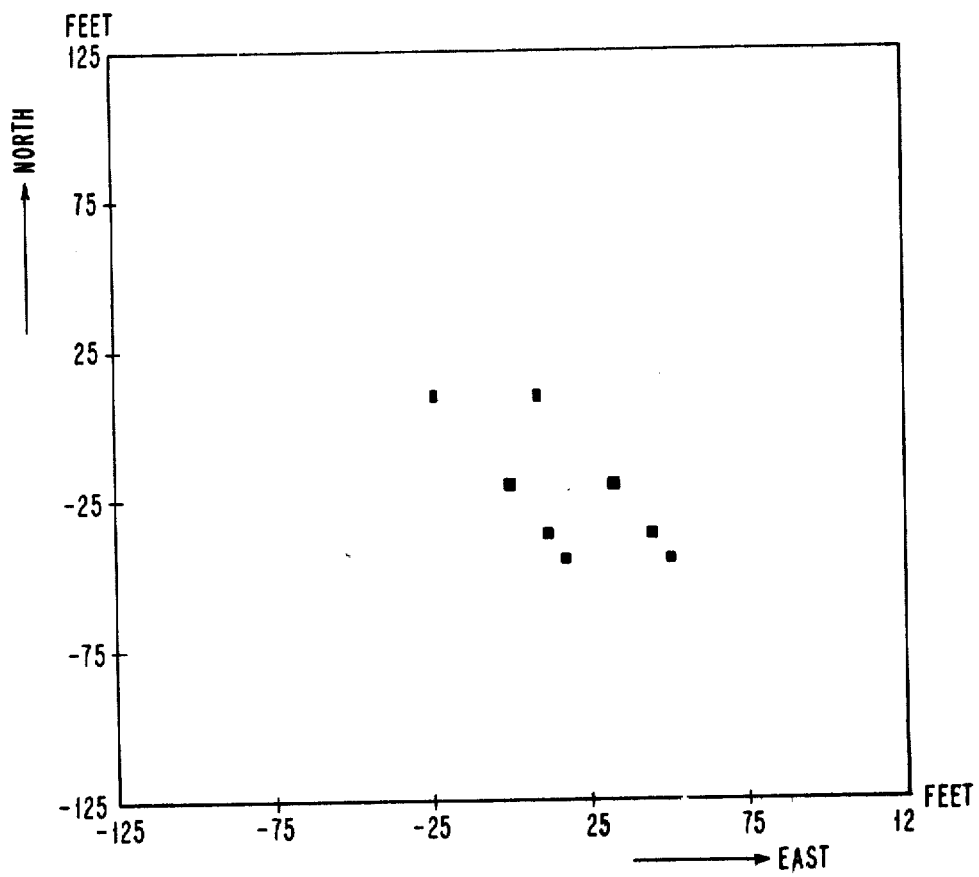
FIG. 4 is a simulated display of a target area which has been illuminated by a segmented chirp waveform in accordance with the present invention after digital processing of the return signals.

The imaging waveform details realized in accordance with transmission of a segmented chirp waveform or superpulse is depicted in FIGS. 3A to 3D. FIG. 3A shows a linear chirp pulse 56 which would make up the trains found on the output lines 24 and 26 of the SAW switching circuit 22. As modulated onto one each of the carrier frequencies, shown in FIG. 3B, the resultant segmented chirp waveform comprises a superpulse of 64 pulses modulated onto 64 equi-spaced carrier frequencies in the predetermined bandwidth. It should be noted that the superpulses are continuously repeated and transmitted by having the synthesizer circuit 36 return to the initial carrier frequency after it has been stepped through for transmission on the last of the carrier frequencies. Repeated superpulse transmission yields a course image time of 1.2 seconds or 16 superpulses, see FIG. 3C, which itself is duplicated over an exposure period of 50 seconds to yield one foot resolution of the target scene. A simulated display of results obtainable through the use of the present invention is shown in FIG. 4.

When target area replies are received by the antenna 50, they are passed through the RF switch 52 to amplifier 54. The amplified return signal is then fed to the dehop mixer 46 where it is stripped from the carrier frequency. The reference signal identifying the carrier frequency for purposes of removing it from the return signal is made available via line 44 from the frequency switching circuit 40. The rate of replacement of the carrier reference signals on line 44 is also controlled by the gating action of the timing pulses. The resultant received signal is then forwarded to the demixer 30 which strips off the chirp of the echo from a nominal point in the target scene. Again, a reference signal for this purpose is supplied under gating control of the timing pulses via line 26. This forms a dechirped signal which is processed to provide target information.

Receiver 56 filters out extraneous signal noise to yield a residual signal appropriate for processing. A standard analog-to-digital (A/D) converter 58 completes the necessary apparatus. A typical output rate for the A/D converter 58 is about 0.9 million bits per second.

Thus, the present invention has been shown to be effective in breaking up a wideband pulse into a series of accurately defined narrow band pulses to avoid limiting target scene resolution. Its implementation is still relatively simple and inexpensive and can be obtained through the use of narrow band equipment.

While the present invention has been described in the context of a preferred embodiment thereof, it will be readily apparent to those skilled in the art to which it pertains that other modifications and variations can be made therein without departing from the spirit or scope of the present invention. Accordingly, it is not intended that the present invention be limited to the specifics of the foregoing description of the preferred embodiment, but rather as being limited only by the scope of the invention as defined in the claims appended hereto.

I claim:

1. Pulse transmitting apparatus for illuminating a target area of interest, said apparatus comprising:
    (a) generator circuit means for providing a train of chirped pulses, each of said pulses in said train being identical;
    (b) synthesizing circuit means for providing a discrete set of carrier frequencies uniformly spaced from each other within a predetermined bandwidth;
    (c) signal mixing circuit means, operatively coupled to said generator circuit means and said synthesizing circuit means for modulating one each of said chirped pulses onto one of said carrier frequencies to form a segmented chirped output waveform;
    (d) timing circuit means, operatively coupled to said generator circuit means and said synthesizing circuit means for generating a series of timing pulses and for gating thereby the respective output signals of said generator and synthesizing means to said signal mixing circuit means; and
    (e) antenna means, coupled to the output of said signal mixing circuit means, for transmitting said segmented chirped output waveform thereof to illuminate the target area of interest.

2. The apparatus according to claim 1 wherein said generator circuit means, said synthesizing circuit means and said timing circuit means are adapted to provide a repeatable segmented chirped output waveform to said antenna means.

3. The apparatus according to claim 1 wherein said generator circuit means is adapted to provide an interleaved train of chirped pulses.

4. The apparatus according to claim 3 which additionally comprises first switching means operatively coupled to said generator circuit means and said timing circuit means for providing in response to said timing pulses at its outputs, both a first and second deleaved train of chirped pulses, one of said outputs being coupled to said signal mixing circuit means and the other output being available as a reference for demixing purposes.

5. The apparatus according to claim 1 which additionally comprises second switching means operatively coupled to said synthesizing circuit means and said timing circuit means for providing a response to said timing pulses at its outputs, a first and second set of said discrete carrier frequencies, one of said switching means outputs being coupled to said signal mixing means and the other of said outputs being available as a reference for demixing purposes.

6. The apparatus according to claim 5 wherein said generator circuit means is adapted to provide an interleaved train of chirped pulses.

7. The apparatus according to claim 6 which additionally comprises first switching means operatively coupled to said generator circuit means and said timing circuit means for providing in response to said timing pulses at its outputs, both a first and second deleaved train of chirped pulses, one of said outputs being couple to said signal mixing circuit means and the other output being available as a reference for demixing purposes.

8. The apparatus according to claim 7 wherein said generator circuit means, said synthesizing circuit means and said timing circuit means are adapted to provide a repeatable segmented chirped output waveform to said antenna means.

* * * * *